United States Patent [19]
Brennan

[11] 3,723,535
[45] Mar. 27, 1973

[54] PREPARATION OF KETONES

[75] Inventor: John F. Brennan, Des Plaines, Ill.

[73] Assignee: Universal Oil Products Company, Des Plaines, Ill.

[22] Filed: Feb. 20, 1970

[21] Appl. No.: 13,195

[52] U.S. Cl..............260/593 R, 260/590, 260/591, 260/586 R
[51] Int. Cl. ....C07c 49/06, C07c 49/08, C07c 49/30
[58] Field of Search.......260/593 R, 590, 591, 586 R

[56] References Cited

UNITED STATES PATENTS 2,636,901  4/1953  Tindall..........................260/570.8 R
2,647,930  8/1953  Tindall................................260/590

*Primary Examiner*—Daniel D. Horwitz
*Attorney*—James R. Hoatson, Jr. and Raymond H. Nelson

[57] ABSTRACT

Ketones are prepared by treating secondary nitro-substituted compounds in the presence of a catalyst containing a metal of Group VIII of the Periodic Table at elevated temperatures and in a non-aqueous system. The invention is exemplified by the formation of acetone from 2-nitropropane.

6 Claims, No Drawings

PREPARATION OF KETONES

This invention relates to a process for the preparation of keto compounds. More specifically, the invention is concerned with the formation of ketones utilizing a secondary nitro compound as the starting material. Oxygen-containing organic compounds, and particularly ketones, are important intermediates in the chemical industry. For example, one of the most common ketones, namely acetone, is used in the synthesis of acetic anhydride, diacetone alcohol, etc., as a solvent in paints, lacquers and adhesives, in epoxy resins, fibers, pharmaceuticals, rubber antioxidants, etc. Another important ketone is benzophenone or diphenyl ketone which is used in organic synthesis; in perfumery as floral odors and as a fixative, etc. while derivatives of benzophenone are used as ultraviolet absorbers. Likewise, cyclohexanone is used in organic synthesis and particularly, in the preparation of adipic acid and caprolactone; as a solvent for insecticides in aerosol bombs; as a solvent for basic dyes, fats, blown oils, waxes, crude rubber, resins and various other materials. It is also used in wood stains, paint and varnish removers, spot and stain removers, degreasing of metals, in polishes, as a leveling agent in dyeing and delustering of silk, etc. Ketones which are unsymmetrical in nature may also be formed according to this process, these ketones also being important chemical compounds. For example, methyl ethyl ketone is used in lacquers, dewaxing of lubricating oil, paint removers, cements and adhesives, in celluloid manufacture of smokeless powder, in artificial leather dressings, dyes, cleaning fluids, printing, etc.

Heretofore, ketones have been formed from secondary nitro-substituted compounds in a "Nef" process which consumes both caustic and acid, or by a slow, acid catalyzed hydrolysis. In contradistinction to the prior art process, I have now discovered that it is possible to prepare ketones from secondary nitro-substituted compounds by utilizing a metal of Group VIII of the Periodic Table as a catalyst in a non-aqueous system, the catalyst remaining in its natural state during the reaction and, therefore, being reusable in subsequent reactions. By utilizing such a process it is possible to prepare the ketones at a corresponding decrease in expense and, therefore, the finished product will be less expensive to purchase.

It is therefore an object of this invention to provide a relatively inexpensive process for the formation of ketones.

A further object of this invention is to provide a process for the preparation of ketones utilizing a catalytic composition of matter which does not deteriorate or be consumed during the reaction and, therefore, is reusable for subsequent reactions.

In one aspect an embodiment of this invention resides in a process for the preparation of a ketone which comprises treating a secondary nitro compound at an elevated temperature in the presence of a catalyst containing a metal of Group VIII of the Periodic Table, and recovering the resultant ketone.

A specific embodiment of this invention is found in a process for the preparation of a ketone which comprises treating 2-nitropropane at a temperature in the range of from about 100° to about 250°C. and a pressure in the range of from about atmospheric to about 100 atmospheres, in a non-aqueous medium in the presence of a catalyst comprising a nickel-iron mixture, and recovering the resultant acetone.

Other objects and embodiments will be found in the following further detailed description of the present invention.

As hereinbefore set forth the present invention is concerned with a process for the preparation of ketones by treating a secondary nitro-substituted compound in a non-aqueous medium at an elevated temperature in the presence of certain catalytic compositions of matter hereinafter set forth in greater detail. The secondary nitro-substituted compounds which may be utilized as the starting materials for the process of the present invention will possess the generic formula

in which R is independently selected from the group consisting of alkyl, aryl, alkaryl, aralkyl, cycloalkyl radicals and methylene groups of from two to six carbon atoms which together with the C form a cyclic ring. Some specific examples of these compounds will include 2-nitropropane, 2-nitrobutane, 2-nitropentane, 3-nitropentane, 2-nitrohexane, 3-nitrohexane, 2-nitroheptane, 3-nitroheptane, 4-nitroheptane, 2-nitrooctane, 3-nitrooctane, 4-nitrooctane, 2-nitrononane, 3-nitrononane, 4-nitrononane, 5-nitrononane, the isomeric 2-, 3-, 4-, 5-, etc. decanes, undecanes, dodecanes, tridecanes, tetradecanes, pentadecanes, hexadecanes, heptadecanes, octadecanes, nonadecanes, eicosenes, etc. both straight chain and branch chain in configuration; diphenyl nitromethane, 1,2-diphenyl-2-nitroethane, 1,3-diphenyl-2-nitropropane, 1,4-diphenyl-2-nitrobutane, 1,5-diphenyl-3-nitropentane, di-o-tolyl nitromethane, di-m-tolyl nitromethane, di-p-tolyl nitromethane, dicyclopentyl nitromethane, dicyclohexyl nitromethane, 1,2-dicyclopentyl nitroethane, 1,2-dicyclohexyl nitroethane, 1,3-dicyclopentyl-2-nitropropane, 1,3-dicyclohexyl-3-nitropropane, nitrocyclopentane, nitrocyclohexane, nitrocycloheptane, etc. It is to be understood that the aforementioned secondary nitro-substituted compounds are only representative of the class of compounds which may be used, and that the present invention is not necessarily limited thereto.

The reaction conditions at which the conversion of the secondary nitro-substituted compound to the corresponding ketone is effected will include elevated temperatures in the range of from about 100° up to about 250°C. and pressures ranging from atmospheric up to about 100 atmospheres or more. If superatmospheric pressures are to be employed, they are afforded by the introduction of a gas, which is inert for the particular reaction, into the reaction zone. Examples of these gases which are inert for this reaction include nitrogen, helium, carbon monoxide, etc. The reaction is effected in a non-aqueous medium in the presence of a catalyst comprising a compound containing a metal of Group VIII of the Periodic Table. These catalysts will include the metals per se, such as iron, nickel, cobalt and the noble metals including platinum, palladium, ruthenium, rhodium, osmium and iridium or mixtures thereof such as iron-nickel, iron-cobalt, cobalt-nickel. In addition, it is also contemplated within the scope of this invention that the metals may be composited on a solid support such as carbon or metal oxides including alumina, silica or mixtures thereof such as alumina-silica which have been pretreated with an alkali metal or alkaline earth metal, a specific example of this type of catalyst being platinum or palladium composited on an alumina support which has been pretreated by the addition of a lithium compound such as lithium nitrate and thereafter calcined on palladium composited on carbon.

The process of this invention may be effected in any suitable manner and may comprise either a batch or continuous type operation. For example, when a batch type operation is used, the quantity of the secondary nitro-substituted compound is placed in an appropriate apparatus which will contain the catalyst containing a metal of Group VIII of the Periodic Table. It is contemplated, due to the fact that the reaction is effected in a non-aqueous medium, that the charge stock could be dried prior to being charged to the reactor, by any drying steps well known in the art. In another embodiment of the invention, the charge stock comprising the secondary nitro-substituted compound may be placed in a particular apparatus which is made up of a metal or mixtures of metals of Group VIII of the Periodic Table, one particular commercially available metal being stainless steel which comprises mainly a mixture of nickel and iron. The apparatus, whether of metal or containing a catalytic amount of a metal of Group VIII of the Periodic Table, is then heated to the predetermined operating temperature and maintained thereat for a desired residence time which may range from 0.5 up to about 20 or more hours in duration. Upon completion of the desired residence time the apparatus is cooled to room temperature and the reaction mixture is recovered. After being subjected to conventional means of separation which includes washing, extraction, drying, fractional distillation under reduced pressure, etc., the desired compound comprising a ketone is recovered.

It is also contemplated within the scope of this invention that the process may be effected in a continuous manner of operation. When utilizing this type of operation the charge stock which has been previously subjected to the drying step is continuously charged to a reaction vessel which is maintained at the proper operating conditions of temperature and pressure. As in the batch type method of effecting the process, the reactor may comprise a metal of Group VIII of the Periodic Table, or mixtures thereof, whereby no additional catalyst is required. However, if the reactor comprises glass, quartz, or is lined with some non-metallic material, the catalyst comprising a metal of Group VIII of the Periodic Table must be added thereto. If the catalyst is added as a separate entity, the continuous type of operation which may be employed will include a fixed bed type of operation in which the catalyst is disposed as a fixed bed in the reactor and the charge stock passes through said reactor in either an upward or downward flow, a moving bed type of operation in which the catalyst bed and the reactor pass through the reactor either concurrently or countercurrently to each other or the slurry type of operation in which the catalyst is carried into the reactor as a slurry in the charge stock. After completion of the desired residence time the reactor effluent is continuously withdrawn and subjected to conventional means of separation whereby the unreacted secondary nitro-substituted compounds are separated from the ketone and recycled to form a portion of the feed stock, the ketone compound being recovered and removed to storage.

Examples of ketones which may be prepared according to the process of this invention will include acetone, methyl ethyl ketone, methyl propyl ketone, methyl butyl ketone, methyl amyl ketone, methyl hexyl ketone, diethyl ketone, ethylpropyl ketone, ethylbutyl ketone, dipropyl ketone, dibutyl ketone, etc., benzophenone, 1,3-diphenyl acetone, 1,5-diphenyl diethyl ketone, 1,3-dicyclohexyl acetone, cyclopentanone, cyclohexanone, cycloheptanone, etc. It is to be understood that the aforementioned ketones are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

A rotating autoclave was dried by heating under a nitrogen atmosphere and thereafter venting the nitrogen from the hot autoclave. Following this 225 mmole of 2-nitropropane which had been previously dried over molecular sieves was charged to the reactor. In addition 100 cc. of benzene which had been dried over a high surface area sodium was used as a solvent. The autoclave, which comprised a stainless steel vessel, was sealed and carbon monoxide pressed in until an initial pressure of 100 atmospheres was reached. The autoclave was heated to a temperature of 190°C. and maintained thereat for a period of 6 hours. At the end of this time heating was discontinued and the autoclave allowed to return to room temperature. The liquid products which were obtained were analyzed by means of a Gas-Liquid Chromatograph, there being recovered 125 mmoles of acetone.

EXAMPLE II

In this example 157 mmoles of nitrocyclohexane was charged to a rotating autoclave which had been dried by heating under a nitrogen atmosphere and thereafter venting the nitrogen from the hot autoclave. Previously to charging the nitrocyclohexane, it was dried over molecular sieves. In addition, the autoclave contained a catalyst comprising platinum composited on carbon. The autoclave was sealed and carbon monoxide pressed in until an initial pressure of 100 atmospheres was reached. The autoclave was then heated to a temperature of 190°C. and maintained thereat for a period of 6 hours. At the end of this time heating was discontinued, the excess pressure was discharged and the autoclave was opened. Analysis of the liquid product by means of a Gas-Liquid Chromatograph verified the formation of cyclohexanone.

EXAMPLE III

To illustrate a continuous manner of operation 20 cc. of a catalyst comprising palladium composited on carbon is placed in a downflow reactor. The reactor is heated to a temperature of 190° and 95 mmoles of 2-nitropropane are charged to the reactor after preheating thereof at a liquid hourly space velocity of 0.25, said run being made for a period of 2 hours. The liquid effluent which is non-volatile at room temperature is collected in a trap beneath the reactor. Analysis of this liquid effluent verifies the formation of acetone.

EXAMPLE IV

In this example 225 mmoles of a charge comprising a previously dried 2-nitrobutane is placed in a stainless steel rotating autoclave. In addition, a solvent comprising 100 cc. of benzene which is also previously dried by passage over a high surface area sodium is placed in the autoclave. The autoclave is sealed and heated to a temperature of 190°C. for a period of 6 hours. At the end of this time heating is discontinued and the autoclave is allowed to return to room temperature. The liquid product is subjected to analysis by means of a Gas-Liquid Chromatograph and the presence of methyl ethyl ketone is verified thereby.

EXAMPLE V

To a glass tube containing a catalyst comprising palladium composited on carbon and maintained at a temperature of 200°C. is charged 225 mmoles of diphenylnitromethane. The diphenylnitromethane is charged to the reactor at a liquid hourly space velocity (the amount of feed per amount of catalyst per hour) of 0.25. The liquid effluent which is recovered is analyzed by means of a Gas-Liquid Chromatograph and the presence of benzophenone is verified thereby.

EXAMPLE VI

To a stainless steel autoclave is added 200 mmoles of 3-nitropentane and 100 cc. of benzene, the benzene is previously dried by passage over a high surface area sodium. In addition, prior to charging the materials thereto, the autoclave is also dried by heating under a nitrogen atmosphere and thereafter venting said nitrogen while the autoclave is still hot. The autoclave is sealed and helium pressed in until an initial pressure of 10 atmospheres is reached. The autoclave is heated to a temperature of 200°C. and maintained thereat for a period of 6 hours. At the end of this time heating is discontinued, the autoclave is allowed to return to room temperature and the excess pressure is vented. Recovery of the liquid product and analysis by means of a Gas-Liquid Chromatograph will disclose the presence of diethyl ketone.

I claim as my invention:

1. A process for the preparation of a ketone which comprises reacting a secondary nitro-alkane in a non-aqueous medium and in contact with a metal of Group VIII of the Periodic Table at a temperature above 100°C. to about 250°C. and a pressure of from about atmospheric to about 100 atmospheres.

2. The process as set forth in claim 1 in which said metal is a nickel-iron mixture.

3. The process as set forth in claim 1 in which said metal is palladium.

4. The process as set forth in claim 1 in which said secondary nitro alkane is 2-nitropropane and said ketone is acetone.

5. The process as set forth in claim 1 in which said secondary nitro alkane is 2-nitrobutane and said ketone is methyl ethyl ketone.

6. The process as set forth in claim 1 in which said secondary nitro alkane is 3-nitropentane and said ketone is diethyl ketone.

* * * * *